United States Patent [19]

Butler L.

[11] Patent Number: 4,715,643
[45] Date of Patent: Dec. 29, 1987

[54] REAR WINDOW LOUVER FOR PICKUP TRUCKS AND METHOD FOR MAKING SAME

[75] Inventor: Diego Butler L., Richardson, Tex.

[73] Assignee: Deflecta-Shield Corp., West Des Moines, Iowa

[21] Appl. No.: 20,472

[22] Filed: Mar. 2, 1987

[51] Int. Cl.⁴ ............................................. B60J 3/00
[52] U.S. Cl. .................................... 296/97 A; 52/473
[58] Field of Search ............. 296/97 A, 97 R; 52/473; 49/61, 62, 63

[56] References Cited

U.S. PATENT DOCUMENTS 4,006,933 2/1977 Simpson ............................ 296/95 R
4,358,488 11/1982 Dunklin ............................ 296/97 R
4,652,038 3/1987 Aunger ............................. 296/97 A Primary Examiner—Robert R. Song
Attorney, Agent, or Firm—Zarley McKee, Thomte, Voorhees & Sease

[57] ABSTRACT

A universal rear window louvered unit for pickups which has a louvered window frame with the perimeter edge of generally conforming configuration to a pickup rear window and a series of spaced-apart louvers extending across the frame, with each louver having a flush mount bottom portion adapted for easy planer cutting removal. Optionally, the unit has a removable center portion which can be taken out to provide access to a slider window. The unit is designed for elimination of labor intensive steps and preparation.

11 Claims, 7 Drawing Figures

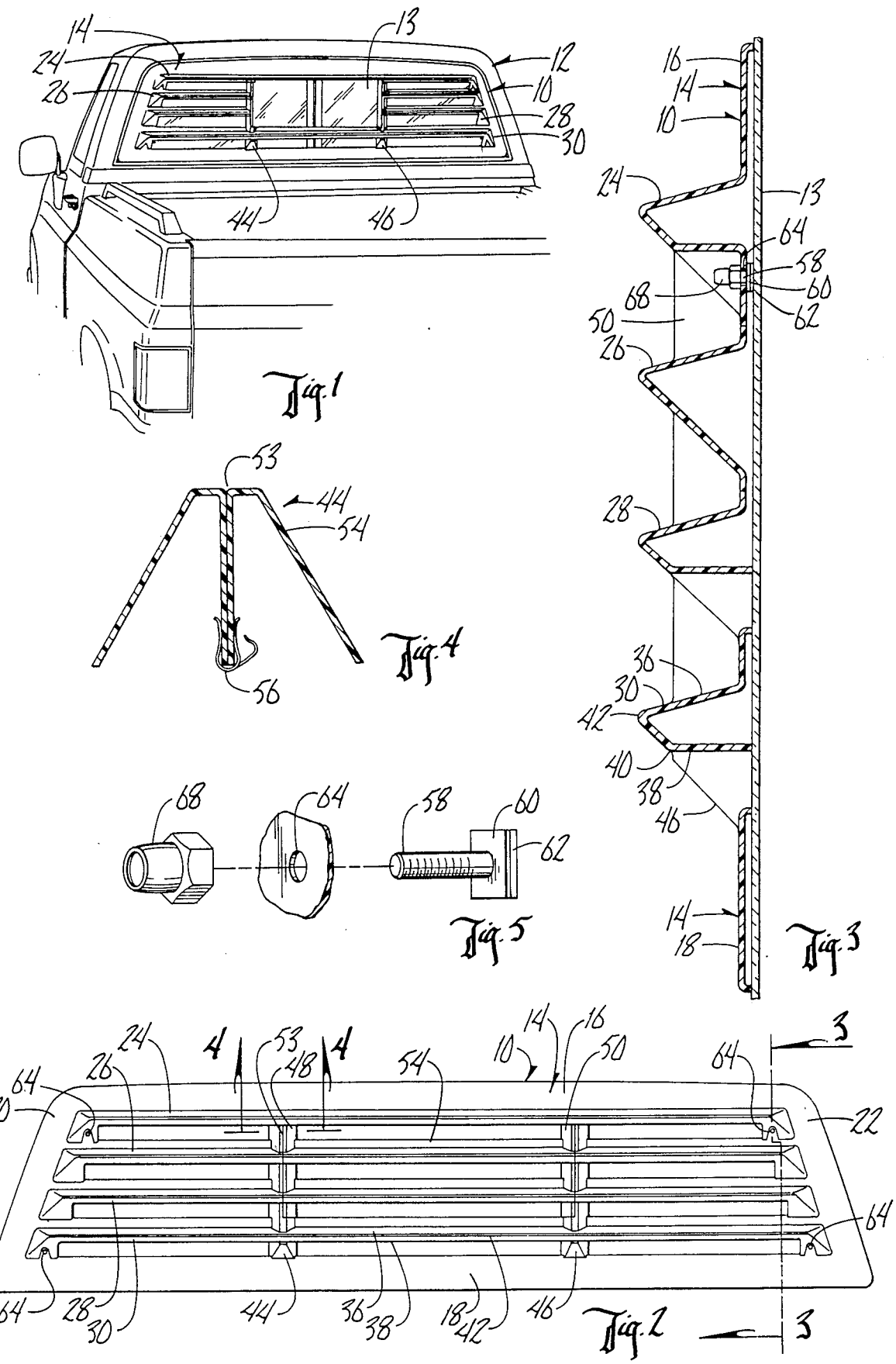

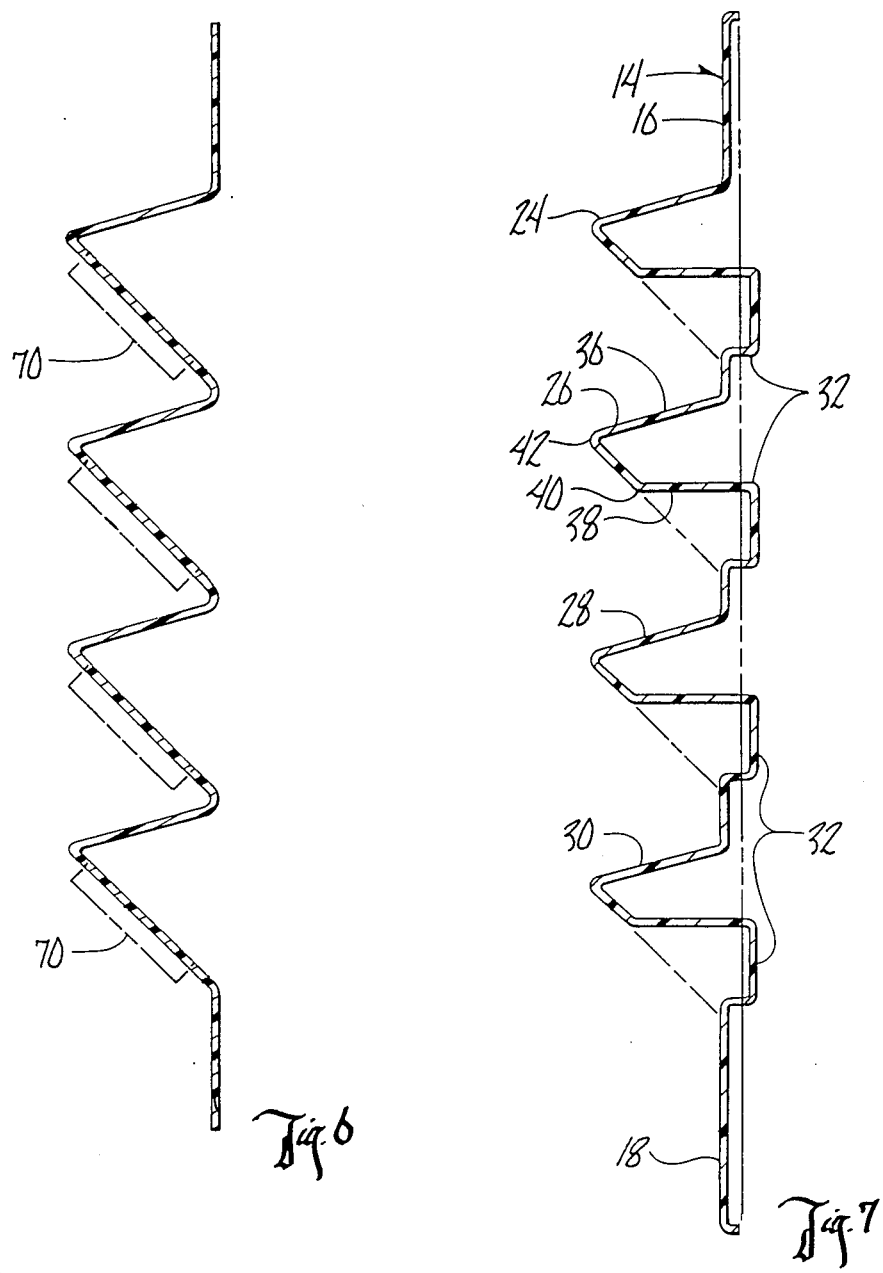

REAR WINDOW LOUVER FOR PICKUP TRUCKS AND METHOD FOR MAKING SAME

BACKGROUND OF THE INVENTION

With the increasing popularity of pickup trucks, there is an ever increasing demand for rear window louvers. There are perceived by many as making the pickup have a more sporty look. Such units generally mount across the rear window, giving somewhat the appearance of an exterior window shade. Generally, such units are made of pre-formed, molded plastic and are mounted on the exterior window of the pickup. They provide privacy, protection from the sun and at the same time also allow rear vision.

While such rear window units are popular, at the same time they are extremely labor intensive in manufacture. This is because the units are typically made by injection molding followed by manual cutting out of the segments between the louvers. These cuts must individually be made, and in typical prior art louvers are made on an angle. This is a highly labor intensive project. Often it takes to as many as six minutes to use a router or other cutout tool for each individual rear window louver unit. The result is extreme expense in preparing a highly labor intensive automotive accessory.

Additionally, another problem with prior art rear window louvers is that with the increasing popularity of slider windows mounted in the rear window framework of the pickup truck, a rear window louver unit cannot be used. Put another way, the rear window louver unit prohibits accessibility to the slider window. Thus, the truck user must make a choice between either the rear window louver unit or the slider window.

A primary objective of the present invention is to prepare a rear window louver unit which is universally adaptable, and which is not labor intensive in preparation, in that louver cutouts can be made in just a few seconds, rather than minutes.

A further objective of the present invention is to prepare a rear window louver unit having the above mentioned advantages and as well which also has a removable center section to allow access to channeled slider windows.

A further objective of the present invention is to provide a universal use rear window louvered unit having a removable midsection which can be used for pickup trucks having a solid glass window, without removal of the midsection, and which can alternatively be used for pickup trucks having a channeled slider window by simply removing the midsection.

A further objective of the present invention is to provide a process for preparing universal rear window louvered units, which is not labor intensive.

A still further objective of the present invention is to provide a universal rear window louvered unit which has attachment means which allow easy attachment to rear pickup truck windows, regardless of how the window itself is attached to the pickup, i.e. both for standard window attachments and gasketless rear windows.

The method and means for accomplishing each of the above objectives as well as others will become apparent from the detailed description given below.

BRIEF DESCRIPTION OF THE DRAWINGS

FIG. 1 is a perspective view of a pickup truck showing a rear window louver of this invention attacted thereto.

FIG. 2 is a plan view of a rear window louver unit of this invention.

FIG. 3 is a sectional view along line 3—3 of FIG. 2, showing how the unit is attached to the rear window of a pickup.

FIG. 4 shows the attaching clip in position for attachment of the removable midsection to the remainder of the louvered unit.

FIG. 5 shows the specially designed adhesive head attaching bolt.

FIG. 6 shows a standard prior art louver unit, in cross section, and shows how the cuts are typically made.

FIG. 7 shows in cross section the unit of the present invention, showing how the bottom of each louver unit is flush, and adapted for single planer flush cuts on cutout jig.

SUMMARY OF THE INVENTION

A universal rear window louver unit for pickups. Each of the louver units has a substantially flush-mount bottom portion which can be cut out by a single planer positioned cutting tool laying on a cutout jig. The result is a louver unit which can be prepared with a minimum of labor-intensive cutting effort. Additionally, the unit has a removable midsection in a preferred embodiment, and finally the unit is adaptable for depth adjustment attachment to all types of pickup truck rear windows.

DETAILED DESCRIPTION OF THE INVENTION

The rear window louver unit 10 is of general conforming shape to the rear window of a pickup truck 12. The unit 10 is typically made by molding in a dye or plastic injection molding. The unit itself may be formed by tough exterior polymeric plastic materials such as ABS (acrylonitrile-butadiene-styrene copolymer) plastic or other usable moldable polymeric plastic materials. The details of the plastic formation within a mold or dye for the same are not part of the invention, the details of which are well known and need not be given herein.

The rear window louver unit 10 has a frame defined by a perimeter edge portion 14 which is of general conforming shape to a pickup truck rear window. Generally perimeter portion 14 has a top 16, a bottom 18, and sides 20 and 22. A series of spaced apart, generally parallel louvers form an integral part of the unit, 24, 26, 28 and 30. Preferably louvers 24, 26, 28 and 30 are of identical configuration, in general cross-sectional view. As best depicted in FIG. 7, the space inbetween each louver is characterized by flush mount bottom portion 32 (FIG. 7), which may be removably cut. Louver 24 is defined by an upwardly and inwardly sloping straight wall 36 and an upwardly and inwardly sloping wall 38 which has shoulder 40, with the two walls joining at top 42. Each of the other louvers, 26, 28 30 and 32 are of the same cross-sectional configuration as illustrated in FIG. 7.

A pair of cross struts 44 and 46 extend transverse to the longitudinal axis of each of the louvers 24, 26, 28 and 30. An edge 53 along the tops 48 and 50 of struts 44 and 46 defines a midsection to be removable. The midsection is referred to generally as 54. Midsection 54 can be removably held in place by clips 56.

As best depicted in FIGS. 3 and 5, the unit may be removably attached to the rear window 13 of pickup 12. Flush head bolts 58 are used with the head 60 having securely attached thereto and adhesive material 62. Top louvers 24 and bottom louver 30 each have at their respective corners an aperture 64 for attachment to one of the fastening bolts. The bolt is extended through the bottom side and adhesive material 70 exposed for afixing directly to the rear window 13. Cap nuts 68 are then attached to hold the unit in place. Thus, the unit is securly held but at the same time is removably held. Depth may be adjusted by how tight cap 68 is threaded upon bolt 58. The center section 54 may be removed, if one has a slider window by simply removing clip 56. A unit is thus capable of flush mount, without regard to the particular type of window attachment to the truck, i.e. whether with a gasket or gasketless.

One of the primary advantages of the present louvered unit is that it is of universal usage, for both solid piece rear windows and rear windows which have channeled slider window units. Moreover, the unit is capable of flush mounting. In addition, the unit can be conveniently made in a manner which is not labor intensive from the standpoint of preparing the louver cutouts. This is best depicted in FIG. 6.

As seen in FIG. 6, prior art louvers have a different shape than those of the present invention, and they necessitate cutouts on an angle as depicted by line 70 of FIG. 6. These angle cutouts are difficult to make, and require hand work, leaving a rough, obviously handmade and unattractive, edge. In contrast, the louver units of this invention, because of the louver shape (FIG. 7) can be cut out by using a single jig with a fixed planer-positioned, attached router. The entire unit 10 is simply positioned on the jig, over the router and moved to make cutout portion, best depicted at 32. In comparison with prior art units, the labor intensive cutout averaged six minutes for a unit of the FIG. 6 configuration, but averages less than one minute for a unit of FIG. 7. The result is that a highly less expensive unit can be prepared which offers more attractiveness from the standpoint of uniformity of the cutouts and which is considerably less expensive to build.

It can therefore be seen that the invention accomplishes at least all of its stated objectives.

What is claimed is:

1. A universal rear window louvered unit for pickups, comprising:

a louvered window frame of generally conforming shape to a pickup truck rear window;

said frame having a perimeter edge portion of general conforming configuration to a pickup rear window; and a series of spaced apart louvers extending across said frame;

said louvers each having a flush mount bottom portion therebetween adapted for easing planer cutting removal.

2. The unit of claim 1 wherein said flush mount bottom portions are cut out.

3. The unit of claim 1 which includes a removable midsection within the unit for optional removal to provide access to slider windows.

4. The unit of claim 1 which includes universal depth adjustable fasteners for attachment of said unit to a pickup truck rear window.

5. The unit of claim 4 wherein said fasteners comprise a threadable bolt having an adhesive material attached to a flush bolt head for adhering attachment to a rear window, and a threadable nut cap for the same.

6. The unit of claim 3 wherein said removable midsection is secured to said frame by fastening clips.

7. The unit of claim 1 wherein each of the louvers are defined by converging sidewalls which join to define a top, and have interposed therebetween a flush mount bottom portion, dwelling in generally the same plane as said perimeter edge portion.

8. The unit of claim 7 wherein said flush mount bottom portions are cut out.

9. The unit of claim 1 wherein said unit is integrally formed from a polymeric plastic material.

10. The unit of claim 9 wherein said plastic material is ABS.

11. A method of making a rear window louvered unit for pickups which comprises:

forming a polymeric plastic louvered window frame of generally conforming shape to a pickup truck rear window, with the frame having a perimeter edge portion of generally conforming configuration to a pickup rear window, and a series of spaced apart louvers extending across said frame, with each of said louvers having a flush mount bottom portion extending therebetween and dwelling within the same general plane as the perimeter edge portion of said frame; and cutting said flush mount bottom portion from between each of said louvers.

* * * * *